United States Patent [19]

Uihlein et al.

[11] Patent Number: 5,087,512
[45] Date of Patent: Feb. 11, 1992

[54] SURFACE COATING FOR PROTECTING A COMPONENT AGAINST TITANIUM FIRE AND METHOD FOR MAKING THE SURFACE COATING

[75] Inventors: Thomas Uihlein, Karlsfeld; Gerhard Wydra, Oberschleissheim, both of Fed. Rep. of Germany

[73] Assignee: MTU Motoren-und Turbinen-Union Muenchen GmbH, Munich, Fed. Rep. of Germany

[21] Appl. No.: 625,747

[22] Filed: Dec. 11, 1990

[30] Foreign Application Priority Data

Dec. 12, 1989 [DE] Fed. Rep. of Germany ....... 3940914

[51] Int. Cl.$^5$ .......................... B32B 15/04; B32B 33/00
[52] U.S. Cl. ..................... 428/266; 428/288; 428/263; 428/183; 428/256; 428/632; 428/631; 428/660; 428/328
[58] Field of Search ............... 428/263, 183, 256, 266, 428/288

[56] References Cited

U.S. PATENT DOCUMENTS

| | | | |
|---|---|---|---|
| 2,858,600 | 11/1958 | Vigor | 29/198 |
| 3,471,342 | 10/1969 | Wood | 428/660 |
| 4,024,303 | 5/1977 | Hahn | 427/295 |
| 4,137,370 | 1/1979 | Fujishiro et al. | 428/660 |
| 4,238,551 | 12/1990 | Lal et al. | 428/660 |
| 4,305,998 | 12/1981 | Marty et al. | 428/661 |

Primary Examiner—George F. Lesmes
Assistant Examiner—Richard Weisberger
Attorney, Agent, or Firm—W. G. Fasse

[57] ABSTRACT

A structural component of metal is protected against titanium fires that can be caused by flying and burning titanium droplets, e.g. in a propulsion unit. The protection against titanium fires of metal structural components is provided by a surface coating made of ceramic fibers embedded in a matrix material of a high temperature lacquer having dispersed therein aluminum powder as a filler material. The high temperature resistant lacquer is formed of silicates as a vehicle in which the aluminum powder is dispersed.

12 Claims, 1 Drawing Sheet

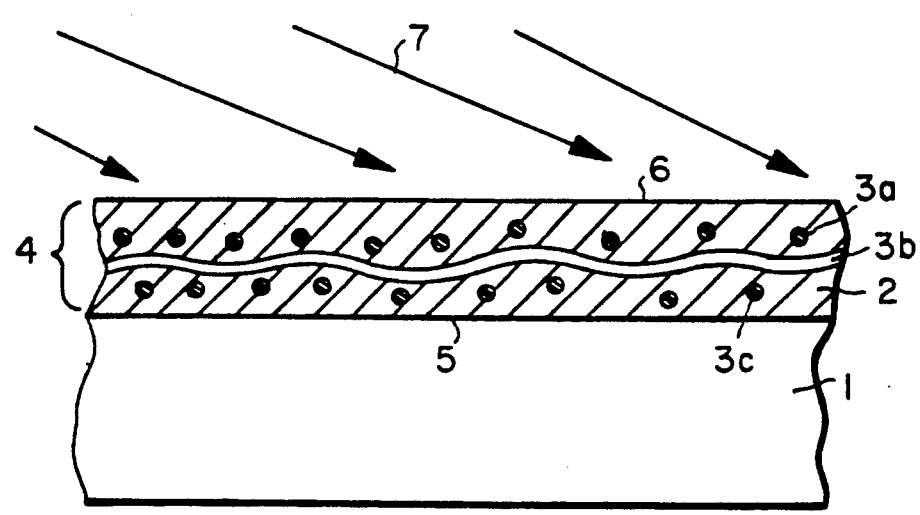

5,087,512

SURFACE COATING FOR PROTECTING A COMPONENT AGAINST TITANIUM FIRE AND METHOD FOR MAKING THE SURFACE COATING

FIELD OF THE INVENTION

The invention relates to a protective surface coating on a structural component made of metal. Such metal components can be set on fire or at least damaged on the surface by a so-called titanium fire that can be caused by molten titanium droplets, for example, in a turbine. The protective coating is made of ceramic fibers embedded in a matrix material.

BACKGROUND INFORMATION

A spontaneous ignition of titanium is possible at temperatures above 500° C. in an oxidizing atmosphere. The resulting fire in the form of spraying molten titanium droplets endangers and impairs the possible utilization of this material at higher operating temperatures. German Patent Publication 3,906,187, corresponding to U.S. Ser. No. 07/485,044, filed on Feb. 26, 1990, discloses a solid or compact coating for components subject to titanium fires which bring such fires under control. However, the drawback of such conventional coatings is their limited thickness, which is easily penetrated by molten titanium droplets having a high kinetic energy when high intensity titanium fires occur. The penetrated surfaces of the structural metal are then subjected to oxidizing attack. Besides, the density of the known coatings makes the coating rather heavy. Further, the known coatings have a low thermal insulation or low R-factor.

German Patent Publication (DE-AS) 1,947,904 discloses a fiber composite material of aluminum silicate fibers in a silicon dioxide matrix including aluminum or silicon particles and, preferably, a filler of coke or aluminum dioxide. The just mentioned publication also describes a method for the manufacture of the fiber composite material. The known fiber composite material has the drawback that the arrangement of the fibers, due to the described manufacturing process from an aqueous sludge, tends to be irregular and haphazard. Unavoidable local concentration or thinning of fibers leads to disadvantageous nonuniformities in the fiber composite material and weaken its protective effect. The silicon dioxide matrix made from silicic acid has the further disadvantage of high temperature embrittlement due to Christobalit formation. Hence, the known material is not suitable for continuous loading in the hot gas flow of, for example, a gas turbine engine.

OBJECTS OF THE INVENTION

In view of the above it is the aim of the invention to achieve the following objects singly or in combination:

to provide a protective coating for a metal structural component, which coating will effectively protect the component against damage by titanium fires;

to provide a method for the manufacture of the protective coating;

to effectively check or control a titanium fire that causes molten titanium droplets having a high kinetic energy;

to protect the surfaces of the structural component against heat damage and titanium melt attack; and to generally contain titanium fires from spreading.

SUMMARY OF THE INVENTION

According to the invention a coating is made of ceramic fibers of $SiO_2$, $Al_2O_3$, $ZrO_2$ or of mixtures of said oxides are arranged in layers or as a web or webs and embedded in a matrix material made of silicates having embedded in the matrix material aluminum powder as a filler. The silicates are selected from the groups of organo- or metalsilicates according to U.S. application Ser. No. 07/485,044, whereby silicates of alkyl, sodium, potassium, aluminum, or zinc are preferred.

The advantage of such a coating on a structural component, is that the kinetic energy of the molten titanium droplets is absorbed by the fiber-matrix-structure of the coating and the thermal energy of the titanium melt is used up in the melting of the aluminum powder embedded in the matrix of the coating. Further, the high thermal insulation property of the ceramic fibers in a silicate matrix prevents overheating of the surface of the structural component to be protected. The arrangement of the ceramic fibers in this protection coating against titanium fires in layers or as a web or fabric advantageously creates a homogenous fiber net which avoids the uneven distribution of the previously known fiber arrangements. The present coating also has a higher resistance against erosion than conventional coatings.

Preferably, the matrix is formed of an inorganic high temperature lacquer which has the advantage of a simultaneous adhesive bonding action and embedding to hold the protective mat to the surface of the metal structure. This feature obviates the need for a partial fastening of the ceramic fibers by sintering, soldering, or welding to the structural component surface which is to be protected.

Component surfaces coated in accordance with the invention are preferably used in gas turbines for aviation engines. For this purpose a preferred protective coating of the invention has a density within the range of 0.8 to 2.0 g/cm$^3$. This low density has the advantage that a relatively thick protection coating, in comparison to conventional denser coatings, can be used without a weight increase, so that the kinetic energy of molten titanium droplets can be absorbed by the present coating.

Protection coatings according to the invention have a thickness within the range of 0.5 to 20 mm. preferably from 1 to 10 mm. The preferred range covers protective coatings for most purposes while the extended range advantageously also permits extremely thin and relatively thick coatings for special purposes. The thin range of 0.5 to 1.0 mm competes with compact or dense conventional coatings with the added advantage that the present coatings are permeated by thermally insulating ceramic fibers, while dense conventional coatings do not provide a useful heat insulation. The thickness range from 10 to 20 mm provides solutions to titanium fire protection problems that heretofore could not be realized.

The sealing of the surface of the coating advantageously provides a nonporous, gas-tight cover for the structural component in combination with the protection against titanium fire, so that penetration and inflation of the fabric by an oxidizing gas flow is prevented.

The method for manufacturing the present coating on a structural component for protection against a titanium fire, is performed as follows:

(a) drying or heating of the ceramic fibers of a ceramic fiber material in the form of layers or webbings or fabrics to clean the surface of the fibers;

(b) infiltration or impregnating of the ceramic fiber material with silicates, selected from the above mentioned group, whereby alkyl silicates, sodium silicates, potassium silicates, and mixtures of the foregoing silicates are preferred, (c) application of an inorganic high temperature lacquer of a silicate binder and an aluminum powder dispersed in the silicate binder, wherein the aluminum powder forms a filler, to the surface of the structural component and to the surface of the ceramic fibers, (d) placing said infiltrated or impregnated fiber material on said coated surface of said structural component.

(e) coating and infiltrating said fiber material with said high temperature inorganic lacquer of a silicate binder and an aluminum powder dispersed as a filler in said silicate binder.

(f) drying or burning-in of the high temperature lacquer, and (g) sealing of the surface of the protective coating with silicates also from the above group. The silicate binder of step (c) is selected from the group of organo- or metalsilicates.

The advantage of the present method is that a cost and functionally effective protection against titanium fire is provided with commercially available means. The protection simultaneously reduces the thermal loading of the structural component because of the heat insulating properties of the ceramic fibers and of the silicates.

The drying or heating of the fibers of the ceramic material in the form of layers, webbings, or fabrics cleans the ceramic fibers, so that the subsequent infiltration or embedding of silicates fully penetrates the fabric and wets the surface of the fibers. The above mentioned silicates may be used singly or in any combination of the silicates listed.

The application of an inorganic high temperature lacquer with aluminum filler to the surface of the structural component greatly improves the bonding of the coating to the component surface. After placing the infiltrated fiber material onto the lacquered component, the surface of the fiber material is again brush painted, sprayed, or spattered, so that the following drying and burning-in process forms a protective coating made of ceramic fibers of $SiO_2$, $Al_2O_3$, $ZrO_2$, or mixtures thereof, whereby the fibers are embedded in the matrix material containing silicates with aluminum powder embedded in the silicates.

The surface of the protective coating often has open pores, and is wavy and uneven. Therefore, the surface is afterwards sealed in such a way with silicates that it becomes gas-tight and smooth. The silicates are selected from the above group.

To make protective coatings of greater thickness another, or even several, applications of fiber material and an inorganic high temperature lacquer are applied to the unsealed surface so that protective coatings of thickness up to 20 mm can be manufactured.

BRIEF DESCRIPTION OF THE DRAWINGS

In order that the invention may be clearly understood, it will now be described, by way of example, with reference to the single Figure illustrating an example embodiment and a manufacturing method, whereby the Figure shows the construction of a metal structural component coated on its surface with a protection against titanium fire.

DETAILED DESCRIPTION OF PREFERRED EXAMPLE EMBODIMENTS AND OF THE BEST MODE OF THE INVENTION

The figure shows the construction of a structural component 1 of metal, for example steel, with a protective coating 4 which firmly adheres to the surface 5 of the structural component 1. The adhesion is due to the inorganic high temperature lacquer which forms, together with silicates as binder and aluminum powder as filler, a matrix material 2 of the protective coating 4. Ceramic fibers are embedded in the matrix material 2 which contains ceramic fibers 3a, 3b, 3c of $SiO_2/Al_2O_3$ arranged, for example, in three plies. In the figure one fiber 3b is shown to extend longitudinally. However, there are more than one longitudinally extending fibers 3b to form an intermediate fiber ply. A plurality of cross-sectioned fibers 3a, 3c form two further plies. These fiber plies may be interwoven with each other to form a fabric, or they may simply form non-interwoven plies or layers. The surface 6, is sealed by silicates to protect the coating against penetration by hot oxidizing gases which hit the surface 6 of the protective coating in the direction of arrows 7.

The structural component of metal with the protective coating against titanium fire secured to the component surface as shown in the figure was made as follows. First, the surface of the structural component 1 was cleaned and a silicate binder was applied to the surface. After drying of the silicate binder, an inorganic high temperature lacquer with aluminum powder as filler was applied. The three layers or plies 3a, 3b, 3c of fiber material of $SiO_2/Al_2O_3$ were first dried and heated to a glow, so that the fiber surfaces were completely free of contaminations.

The three layers or plies of fibers 3a, 3b, 3c were then soaked in silicate, dried, and applied to the surface of the structural component still sticky by the high temperature inorganic lacquer. High temperature lacquer with a filler of aluminum powder, was then sprayed on the fiber layer. Afterwards, the lacquer was dried and baked to a 1 mm thick protective coating on the surface 5 of the structural member 1.

Finally, the surface of the protective coating was sprayed with silicate and heated for the baking or burning-in of the silicate to form a gas-tight seal to protect the protective coating itself against gas and contamination intrusion. The density of the coating in this example is 1.5 g/cm$^3$.

What we claim is:

1. A structural component made of metal to be protected against titanium fire caused by a component of titanium or titanium alloy by a surface coating comprising a matrix material including a mixture of at least one silicate and aluminum powder dispersed in said silicate, and ceramic fibers made of a material selected from the group consisting of silicon oxide, aluminum oxide, zirconium oxide, and mixtures of the foregoing oxides, said ceramic fibers being embedded in said matrix material to form said surface coating against damage by molten titanium or titanium alloy droplets protective coating.

2. The component of claim 1, wherein said ceramic fibers are arranged as layers of said fibers.

3. The component of claim 1, wherein said ceramic fibers are arranged as a fiber fabric or webbing.

4. The component of claim 1, wherein said matrix material comprises an inorganic high temperature lacquer 5. The component of claim 1, wherein said protective coating has a density within the range of 0.8 to 2.0 grams per cubic centimeter.

6. The component of claim 1, wherein said protective coating has a thickness within the range of 0.5 to 20.0 mm.

7. The component of claim 6, wherein said thickness is within the range of 1.0 to 10.0 mm.

8. The component of claim 1, further comprising a gas-tight surface layer on said protective coating.

9. The component of claim 8, wherein said gas-tight surface layer is a silicate layer.

10. The component of claim 1, wherein said silicates of said matrix material are selected from the group consisting of organo- or metalsilicates.

11. The component of claim 1, wherein said aluminum powder in said matrix material has a powder particle size within the range of 3 $\mu$m to 40 $\mu$m.

12. The component of claim 1, wherein said aluminum powder is present in said matrix material within the range of 30 wt. % to 60 wt. %. of said matrix material.

* * * * *